US006669177B2

(12) United States Patent
Shimanuki et al.

(10) Patent No.: US 6,669,177 B2
(45) Date of Patent: Dec. 30, 2003

(54) HUMIDIFYING MODULE

(75) Inventors: Hiroshi Shimanuki, Saitama (JP);
Toshikatsu Katagiri, Saitama (JP);
Motohiro Suzuki, Saitama (JP); Yoshio Kusano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/103,723

(22) Filed: Mar. 25, 2002

(65) Prior Publication Data

US 2002/0139320 A1 Oct. 3, 2002

(30) Foreign Application Priority Data

Mar. 30, 2001 (JP) ........................................ 2001-101415

(51) Int. Cl.[7] .................................................. B01F 3/04
(52) U.S. Cl. ............................... 261/96; 261/104; 96/8
(58) Field of Search ........................ 261/96, 99, 102, 261/104; 95/52; 96/8, 10

(56) References Cited

U.S. PATENT DOCUMENTS

| 1,009,121 A | * | 11/1911 | Weiwoda | |
| 4,220,535 A | * | 9/1980 | Leonard | |
| 5,149,340 A | * | 9/1992 | Waycuilis | |
| 5,288,308 A | * | 2/1994 | Puri et al. | ........................ 96/8 |
| 5,525,143 A | * | 6/1996 | Morgan et al. | ................ 95/52 |
| 6,402,818 B1 | * | 6/2002 | Sengupta | ........................ 96/8 |

FOREIGN PATENT DOCUMENTS

| JP | 07-071795 | | 3/1995 |
| WO | WO 95/01828 | * | 1/1995 |

* cited by examiner

*Primary Examiner*—C. Scott Bushey
(74) *Attorney, Agent, or Firm*—Arent Fox Kintner Plotkin & Kahn, PLLC

(57) ABSTRACT

A humidifying module that includes a plurality of hollow fiber membranes grouped together to form a hollow fiber membrane bundle. A moisture exchange is performed through a thickness of each hollow fiber membrane between fluid streaming within an interior of each hollow fiber membrane and along an exterior of each hollow fiber membrane. An inner flow passage is inserted within the hollow fiber membrane bundle and along a longitudinal axis thereof, wherein a total longitudinal length which the inner flow passage is inserted within the hollow fiber membrane bundle is shorter than a longitudinal length of the hollow fiber membrane bundle. The inner flow passage includes an inlet and an outlet through which the fluid passes. An end wall is located proximate the outlet. A protrusion is disposed at the end wall and opposite a flow direction of the fluid streaming within the inner flow passage.

16 Claims, 7 Drawing Sheets

Sectional view along the line B-B'

Sectional view along the line C-C'

HUMIDIFYING MODULE

BACKGROUND OF THE INVENTION

1. Field of the Invention

The present invention relates to a humidifying module provided with a housing having a bundle of water permeable hollow fiber membranes installed therein. More specifically, the present invention relates to a humidifying module having an inner flow passage through which a fluid passes.

2. Prior Art

The humidifier 100 disclosed in Japanese unexamined patent publication H07-71795 is an example of a humidifier which uses a conventional water permeable hollow fiber membrane. As shown in FIG. 9, the humidifier 100 has a housing 101 with a cylindrical shape that is provided with an inlet 102 and an outlet 103 for loading and discharging dry air provided therethrough, respectively. A hollow fiber membrane bundle 104 includes a plurality of hollow fiber membranes, for example only, 5000, and is installed within the housing 101.

Fixing parts 105 and 105', respectively, are provided at both ends of the housing 101 to support the ends of the hollow fiber membrane bundle 104 without closing the hollow passages within the fiber membranes. The fixing parts 105 and 105' are capped with a head cover 108 and 109, respectively. An inlet 106 for loading humid air therein is formed on the head cover 108. An outlet 107 for discharging the humid air, from which moisture contained therein is separated and eliminated, is formed on the head cover 109.

Humid air loaded through the inlet 106 is passed through the inside of each hollow fiber membrane of the hollow fiber membrane bundle 104. At this time, moisture within the humid air is separated by a capillary condensation phenomenon, and the moisture is then moved to the outer surface of each hollow fiber membrane via capillary action. The humid air from which the moisture is separated is then discharged through the outlet 107.

Dry air (i.e., a low humid gas) is loaded through an inlet 102 and passes through the outer surface of each hollow fiber membrane of the hollow fiber membrane bundle 104. As a result, the dry air is humidified by the moisture separated from the humid air described above. The humidified dry air is then discharged through the outlet 103.

Another humidifier 200, as shown in FIG. 10, is known as "an inner pipe type". The humidifier 200 includes a plumbing 206 having a barrier which serves as an inner flow passage for loading the humid air into the hollow fiber membranes bundle 204. The plumbing 206 is inserted into the hollow fiber membrane bundle 204 and along a longitudinal axis of the hollow fiber membrane bundle 204.

The hollow fiber membrane bundle 204, which includes a plurality of individual hollow fiber membranes, for example only, 6000, is installed within a housing 201. Fixing parts 205 and 205', respectively, are provided at both ends of the housing 201 to support the ends of the hollow fiber membrane bundle 204 without closing the hollow passages within the fiber membranes.

Head covers 208 and 209 are provided on the fixing parts 205 and 205', respectively. An inlet 202 for loading dry air therein is formed on the head cover 209. An outlet 203 for discharging dry air therefrom is formed on the head cover 208.

The plumbing 206, which loads humid air into the hollow fiber membrane bundle 204 by passing the humid air through the through holes 206out, penetrates the head cover 208.

The plumbing 206 passes through both the head cover 208 and the fixing part 205 from the outside, and a tip of the plumbing extends to be within the hollow fiber membrane bundle 204. A total length measured from an inlet 206a to an outlet 206out of the plumbing 206 is established to be shorter than the total length, taken in a direction along the longitudinal axis of the hollow fiber membrane.

An outlet 207 for discharging the humid air, from which moisture contained therein is separated and eliminated by the hollow fiber membrane bundle 204, is formed on the housing 201 next to the head cover 209.

Humid air reaches the through holes 206out by passing through the interior of the plumbing 206 via the inlet 206a. The humid air then streams along the exterior surface of each hollow fiber membrane of the hollow fiber membrane bundle 204.

At that time, moisture within the humid air is separated by a capillary condensation phenomenon, and the moisture then passes through the outer surface and into the hollow fiber membrane. The humid air is then discharged via the outlet 207.

Dry air (i.e., a low humid gas) is loaded through the inlet 202, and passes through the interior of each hollow fiber membrane of the hollow fiber membrane bundle 204. As a result, the dry air is humidified by the moisture separated from the humid air. The dry air is then discharged through the outlet 203.

When the above described conventional humidifier 200 is used in a fuel cell to humidify anode and cathode gasses, several drawbacks must be dealt with. Several of the drawbacks are due to the differences in the shape of a barrier bf at the bottom part 206b of the plumbing 206 or the location of the bottom part 206b.

Since the exhaust gas (i.e., off-gas) is discharged from a fuel cell containing steam and condensed water, the following drawbacks have been known to occur.

For example, if there is condensed water remaining at the end portion 206b of the plumbing 206 and the water freezes therein due to a low temperature, the plumbing 206 tends to fracture because of the stress caused by volume expansion at the time of freezing.

Additionally, when there is an excessive change of power output from the fuel cell, the time required for attaining the required humidification levels takes too long due to the remaining water at the end portion 206b of the plumbing 206 or because of the time lag for loading the steam into the hollow fiber membrane bundle 204. As a result, operational efficiency greatly decreases.

Moreover, if the water remaining at the end portion 206b of the plumbing 206 is cooled during a period of non-use, such as night term, of the fuel cell, the humidification performance at startup of the humidifier 200 greatly decreases because the high humid gas discharged from the fuel cell is cooled by the cold remaining water. Thus, output or startup efficiency of the fuel cell greatly decreases.

SUMMARY OF THE INVENTION

An object of the present invention is to overcome the above-described drawbacks in the industry by providing a humidifying module having a water permeable hollow fiber membrane, wherein an inner flow passage having an end wall is inserted along a longitudinal axis thereof. More particularly, the present invention provides a humidifying module which has improved output and startup efficiency, and prevents water from remaining therein, even if a fluid with steam and condensed water reaches the inner flow passage.

The humidifying module includes a plurality of hollow fiber membranes grouped together to form a hollow fiber membrane bundle, wherein a moisture exchange is performed across a thickness of each hollow fiber membrane between fluid streaming within an interior of each hollow fiber membrane and along an exterior of each hollow fiber membrane. An inner flow passage is inserted within the hollow fiber membrane bundle and along a longitudinal axis of the hollow fiber membrane bundle. A total longitudinal length into which the inner flow passage is inserted within the hollow fiber membrane bundle is shorter than a longitudinal length of the hollow fiber membrane bundle. The inner flow passage includes an inlet and an outlet through which the fluid passes, and an end wall located near the outlet. A protrusion is disposed at the end wall and is opposite to the flow direction of the fluid streaming within the inner flow passage. The present invention provides several advantages.

For example, in the inner flow passage, the inner cross-sectional area gradually decreases in a direction from a tip of the protrusion toward the end wall. Thus, the flow rate of the fluid increases as the fluid flow approaches the end wall.

Additionally, in the inner flow passage, the collision area with the fluid gradually widens as it approaches the end wall. Therefore, the fluid receives shear force along the surface of the protrusion as the end wall approaches, and is pushed radially outward. That is, fluid is pushed outward toward the outer surface more certainly than the inner flow passage of conventional construction wherein the end portion of the inner flow passage is plane shaped and the fluid was received by the entire end portion (i.e., plane surface).

Moreover, in the inner flow passage, as a result of a multiplier effect of these factors, the fluid smoothly passes through the outlet even if steam and condensed water, which tend to easily remain therein, are contained in the fluid.

Also, according to the present invention, the occurrence of any fluid remaining in the humidifying module can be prevented. The drawbacks associated with the conventional modules, such as the fracture of the inner flow passage caused by the remaining water freezing, and the cooling of high-temperature gas discharged from a fuel cell by the remaining water, are prevented. Therefore, the humidifying module, according to the present invention, which provides efficient output and startup to the fuel cell, even if the module is used to humidify gas supplied to the fuel cell, is obtained.

Preferably, the inner flow passage is formed to have a cylinder shape, and the protrusion is formed to have a circular cone shape.

Furthermore, since the same circular members are used, that is, the shape of the inner flow passage is a circular cylinder hollow shape and the shape of the protrusion is a circular cone. Thus, the humidifying module with superior workability is obtained. Since the fluid is supplied over the entire hollow fiber membrane bundle with sufficient fluid distribution in a radial direction, the usability of the hollow fiber membrane is improved.

Additionally, the outlet is a plurality of through holes bored in the circumferential wall of the inner flow passage near the end wall, and at least one through hole is positioned between a tip of the protrusion and the end wall.

According to the present invention, the flow rate to the perpendicular direction of the fluid, in other wards, the rate of diffusion in the radial direction, is increased as a result of arranging the through holes near the end wall of the inner flow passage. Thus, the fluid is supplied over the whole hollow fiber membrane bundle with sufficient fluid distribution toward the radius direction, and the usability of the hollow fiber membrane is improved.

In the present invention, at least one through hole is positioned between the tip of the protrusion and the end wall. In the inner flow passage, therefore, the inner cross-sectional area of the inner flow passage gradually decreases in the direction taken from an inlet toward the end wall. Thus, the fluid flow rate increases as it approaches the end wall.

In the inner flow passage, therefore, the protrusion is provided at the end wall of the inner flow passage so that the tip of the protrusion is opposite to the flow direction of the fluid streaming therein. Thus, the collision area with fluid gradually widens as it approaches the end wall. Therefore, the fluid receives shear force along the surface of the protrusion as it approaches the end wall, and is pushed toward the outside. That is, fluid is pushed toward the outside more certainly than the inner flow passage of conventional construction wherein the end portion of the plumbing is plane shaped and the fluid was received by the entire end portion (i.e., the plane surface).

In the inner flow passage, as a result of the multiplier effect of these factors, when fluid is loaded or directed to the inner flow passage, the fluid directed therein smoothly passes through the outlet because at least one outlet is positioned between the tip of the protrusion and the end wall.

If the outlet is positioned upstream of the tip of the protrusion, since the passing of the fluid is disturbed by the fluid rebounding from the bottom, desirable and effective results are not obtained.

DETAILED DESCRIPTION OF PREFERRED EMBODIMENTS

An explanation of the humidifying module according to the present invention will be made referring to the attached drawings.

Figure 1A:
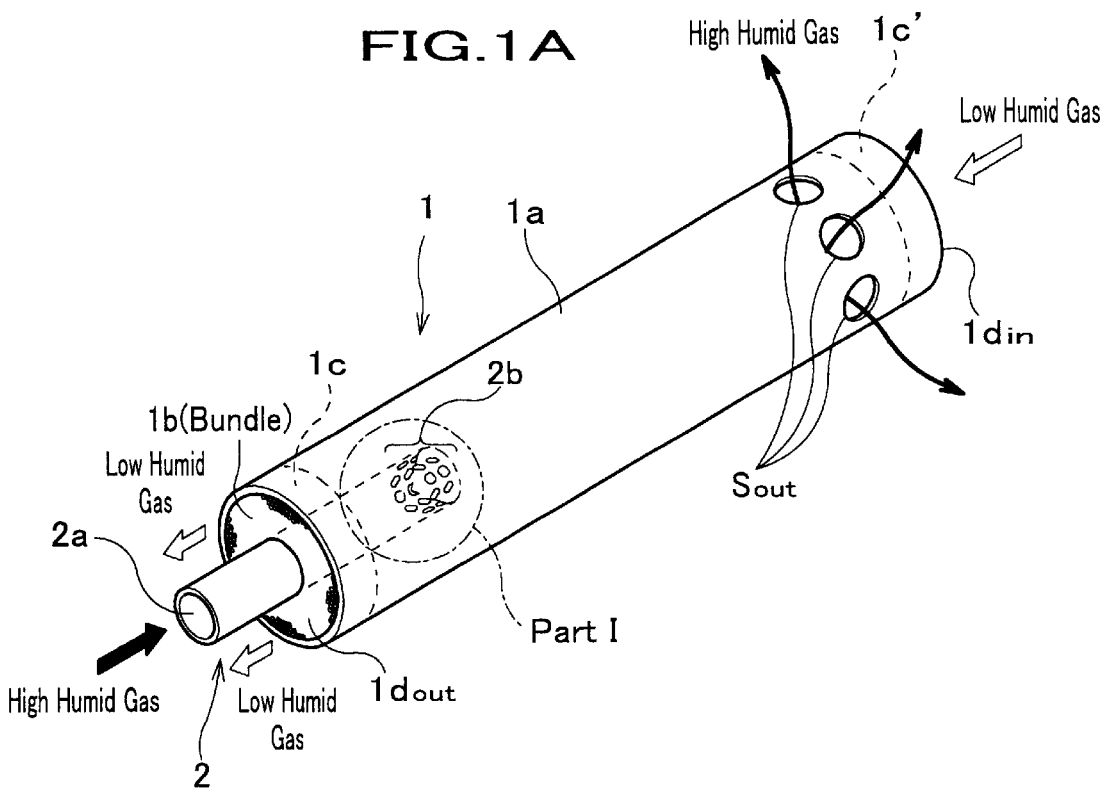
FIG. 1A is a perspective view of the humidifying module according to a preferred embodiment of the present invention.
Figures 1B, 1C:
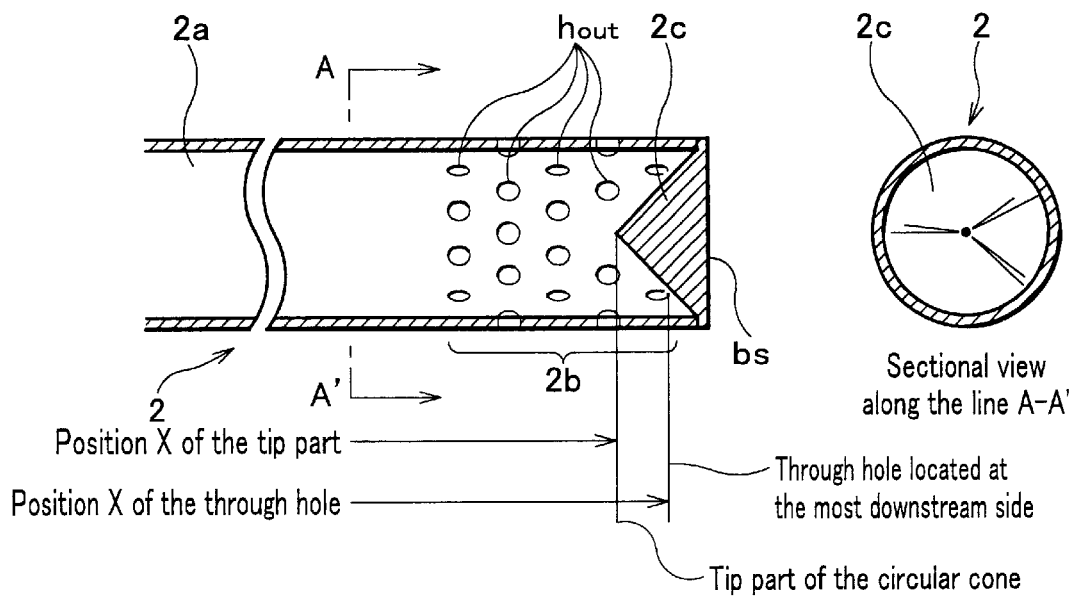
FIG. 1B is a partially enlarged view of Part-I of FIG. 1.
FIG. 1C is a sectional view taken along the line A–A' of FIG. 1B.

As shown in FIG. 1A through FIG. 1C, a humidifying module according to the first preferred embodiment of the present invention includes a housing 1a and a plumbing 2. A hollow fiber membrane bundle 1b, which can perform a moisture exchange across a thickness of each hollow fiber membrane between fluid passing through and outside of each hollow fiber membrane, is installed within the housing 1a wherein both ends of the hollow fiber membrane bundle 2b are fixed.

The plumbing 2 has an inlet 2a for loading or directing the fluid therein, and outlets 2b for directing the fluid, which is fed through inlet 2s, into the hollow fiber membrane bundle 1b, in other words, outside of the hollow fiber membranes. The plumbing 2 is inserted into the hollow fiber membrane bundle 1b, so that the total longitudinal length of the inserted plumbing 2 may be shorter than the longitudinal length of the hollow fiber membrane bundle 1b. The plumbing 2 is inserted about the longitudinal axis of the plumbing 2.

The shape of the housing 1a is a circular cylinder hollow, both sides of which are open, and a plurality of circular through holes Sout are bored along the circumference thereof. The position a plurality of circular through holes Sout are bored is upstream relative to a fixing part 1C', wherein each end of the hollow fiber membranes is fixed by adhesion using resins, and is the opposite side with respect to the inlet 2a of the plumbing 2.

The plumbing 2 has a cylindrical shape with an end wall bs, and acts as an inner flow passage. In other words, the plumbing 2 is a circular hollow pipe, into which an end wall bs is formed, and at the end opposite the wall bs in which an inlet 2a for loading the fluid is formed. A plurality of circular through holes hout are bored near the end wall bs along the circumference of the plumbing 2.

The plumbing 2 is arranged so that the total inserted length of the inlet 2a, for example, the length from the fixing part 1c to the outlet 2b of plumbing 2, may be shorter than the length in the longitudinal direction of the hollow fiber membrane bundle 1b.

By arranging the plumbing 2 in the above described manner, the fluid loaded through the inlet 2a is supplied over the entire longitudinal direction of the hollow fiber membrane bundle 1b.

A protrusion 2c having a circular cone shape is provided at the end wall bs of the plumbing 2 so that the tip of the protrusion 2c is opposite to the flow direction of the fluid loaded through the inlet 2a.

The position where a plurality of through holes Hout are bored is established so that at least one through hole is provided between the tip of the protrusion 2c and the end wall bs. To be more precise, the position X of the through hole, which is located more downstream relative to the other through holes hout, is between the tip of the protrusion 2c and the end wall bs. The through holes Hout are provided near the end wall bs of the plumbing 2 along the circumference of the plumbing 2.

The shape of the through hole is not restricted to the above-described geometric shape and can be any shape so long as the fluid may pass therethrough. For example, a polygonal shape and an oval shape may be acceptable. A long hole prolonging along the circumferential direction may also be acceptable as a shape of the through hole.

When the high humid gas, which is the fluid containing steam and condensed water therein, is loaded to the humidifying module 1 through the inlet 2a of the plumbing 2, the following functions and advantages can be realized.

In the plumbing 2, the cross-sectional flow area of the high humid gas gradually decreases as it approaches the downstream side (i.e., the end wall bs side) from the tip of the protrusion 2c having a circular cone shape. Thus, the flow rate of the high humid gas gradually increases as the gas approaches the downstream side (i.e., the end wall bs side).

In the present invention, since the protrusion 2c has a circular cone shape, the collision area with humid gas gradually widens as the gas approaches the downstream side. Therefore, high humid gas passing through the plumbing 2 receives a shear force along the surface of the circular cone as the gas approaches the downstream side, and thus is pushed toward the outside (i.e., toward a radial outward direction of the hollow fiber membrane). That is, high humid gas is pushed toward the outside more certainly than the conventional construction of the plumbing where the bottom of the plumbing is a plane shape and the fluid was received by the entire end portion (i.e., the plane surface).

As a result of the multiplier effect of these factors, high humid gas loaded through the inlet 2a moves along the surface of the circular cone, and then is smoothly passed through a plurality of through holes hout located at the outlet 2b. Therefore, the occurrence of the remaining fluid at the outlet 2b is prevented, even if the fluid containing steam and condensed water in the mixed condition is directed to the humidifying module 1.

The occurrence of remaining fluid can be prevented as well as the problems in the conventional systems, such as the fracture of the plumbing caused by the freezing of remaining fluid and the aggravation of the starting response of a fuel cell caused by the temperature dropping. The delay of the transient response can also be prevented.

In the present invention, furthermore, since the same type of circular members are used, that is, the shape of the inner flow passage is a circular cylinder hollow shape and the shape of the protrusion is a circular cone, a humidifying module with superior assembling efficiency can be obtained.

Since the fluid is supplied over the entire hollow fiber membrane bundle 1b with sufficient fluid distribution in the radial direction, the usability of the hollow fiber membrane is improved.

In the present invention, high humid gas, supplied to the hollow fiber membranes bundle 1b through a plurality of through holes hout of outlet 2b, streams along the outside of the hollow fiber membranes installed in the housing 1a. At this time, the low humid gas passing through the inside of each hollow fiber membrane of the hollow fiber membrane bundle 1b is thus humidified. The high humid gas, after passing the moisture to the low humid gas, is discharged through the through holes Sout provided along the circumference of the housing 1a.

Low humid gas is loaded through the opening 1din of the housing 1a, so that it must be a countercurrent flow with respect to the flow direction of high humid gas passing along the outside of the hollow fiber membrane. Low humid gas is humidified while passing through the interior of each hollow fiber membrane of the hollow fiber membranes bundle 1b installed in the housing 1a, and is then exhausted or discharged through the opening 1dout of the housing 1a.

The explanation of another embodiment of the protrusion disposed at the end wall of the plumbing in the humidifying module will be made by referring to FIG. 2 and FIG. 3. In the following explanation, except for the shape of the protrusion or the sectional shape of the plumbing, the structure of the humidifier is the same as described above. Therefore, only an explanation regarding the structure and function according to the relevant part will be provided below.

The explanation about the protrusion of the second embodiment provided at the end wall of the plumbing, through which the fluid is supplied to the humidifier, will be provided.

Figure 2A:
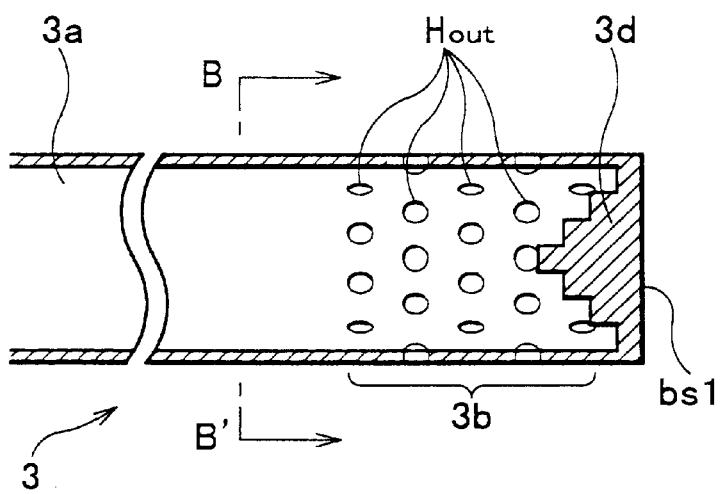
FIG. 2A is a longitudinal section view in the direction of the plumbing into which the protrusion according to a second embodiment of the present invention is disposed.
Figure 2B:
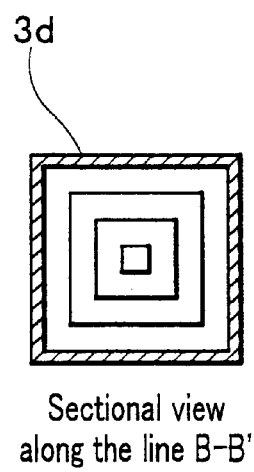
FIG. 2B is a sectional view taken along the line B–B' of FIG. 2A.

The protrusion 3d of the humidifier according to the second embodiment, as shown in FIG. 2, is disposed at the end wall bs1 of the plumbing 3 having a rectangular shape in the sectional view. The protrusion 3d is formed by stacking plates of a square shape so that the size of the squares gradually decreases in the upstream direction, thereby resembling a pyramid in shape. In the present embodiment, the cross-sectional flow area gradually decreases as it approaches the downstream side (i.e., the end wall bs1 side) of the plumbing 2.

Since the protrusion 3d is formed by stacking the plates of square shape, the protrusion having a suitable size depending on the sectional figure of the plumbing 3 is easily manufactured.

The formation manner of the protrusion 3d is not restricted to this manner, for example, the machined technique may be acceptable for forming the protrusion 3d from a single unit of square piece.

When the high humid gas, which is the fluid containing steam and condensed water therein, is loaded into the humidifying module 1 through the inlet 3a of the plumbing 3, the following functions and advantages can be realized.

In the plumbing 3, the cross-sectional flow area of the high humid gas gradually decreases as it approaches the downstream side (i.e., the end wall bs1 side) from the tip of the protrusion 3d having a square stairway or pyramidal shape. Thus, the flow rate of the high humid gas gradually increases as the fluid flow approaches the downstream side (i.e., the end wall bs1 side).

In the present invention, since the protrusion 3d has a square stairway or pyramidal shape, the collision area with humid gas gradually widens as the gas approaches the downstream side. Therefore, high humid gas passing through the plumbing 3 receives shear force along the surface of the square stairway as the gas approaches the downstream side, and thus is pushed toward the outside (i.e., toward a radial outward direction of the hollow fiber membrane). That is, high humid gas is pushed toward the outside more certainly than the conventional construction of the plumbing where the end portion of the plumbing is plane shaped and the fluid was received by the entire end portion (i.e., plane surface).

As a result of the multiplier effect of these factors, high humid gas loaded through the inlet 3a moves along the surface of the protrusion 3d, and then smoothly passed through a plurality of through holes Hout located at the outlet 3b. Therefore, the occurrence of fluid remaining at the outlet 3b is prevented, even if the fluid (i.e., high humid gas) containing steam and condensed water in the mixed condition, is directed to the humidifying module of the second embodiment.

Since the occurrence of the remaining fluid can be prevented, the problems, such as the fracture of the plumbing caused by the freezing of the remaining fluid and the aggravation of the starting response of a fuel cell by the temperature dropping and freezing of the remaining fluid, can be prevented. The delay of the transient response can also be prevented.

The explanation about the protrusion of the third embodiment disposed at the end wall of the plumbing, through which the fluid is supplied to the humidifier, will be provided.

Figure 3A:
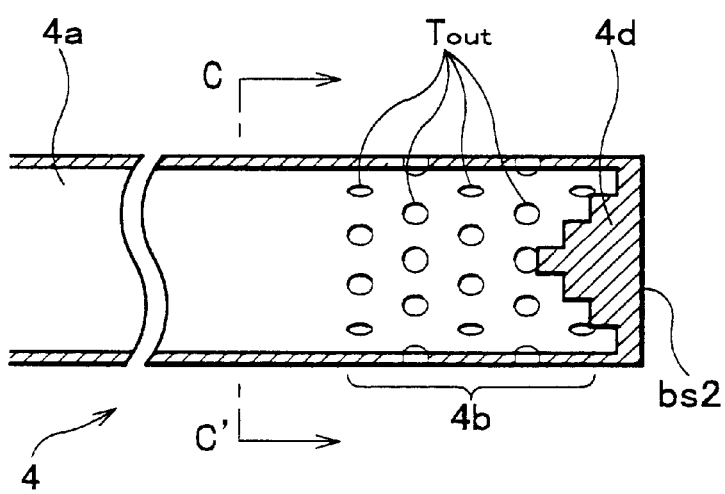
FIG. 3A is a longitudinal section view in the direction of the plumbing into which the protrusion according to a third embodiment of the present invention is disposed.
Figure 3B:
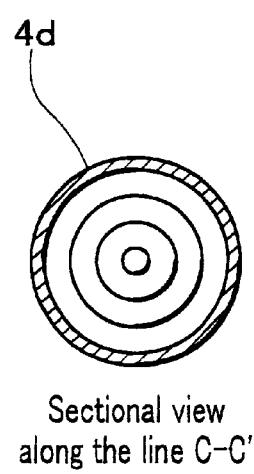
FIG. 3B is a sectional view taken along the line C–C' of FIG. 3A.

The protrusion 4d according to the third embodiment, as shown in FIG. 3, is disposed at the end wall bs1 of the plumbing 4. The protrusion 4d is formed by stacking plates of a circular shape so that the size of the circular plates gradually decreases in a direction toward the upstream side to form a pyramid shape. In the present embodiment, the cross-sectional flow gradually decreases in a direction toward the downstream side (i.e., the end wall bs1 side) of the plumbing 4.

Since this protrusion 4d is formed by stacking the circular plates, the protrusion having a suitable size depending on the sectional figure of the plumbing 4 is easily manufactured.

The formation manner of the protrusion 4d is not restricted to this manner, for example, the machined technique may be acceptable for forming the protrusion 4d from a single circular plate.

When the high humid gas, which is the fluid containing steam and condensed water therein, is loaded into the humidifying module through the inlet 4a of the plumbing, the following functions and advantages can be realized.

In the plumbing 4, the cross-sectional flow area of the high humid gas gradually decreases as it approaches the downstream side (i.e., the end wall bs2 side) from the tip of the protrusion 4d. Thus, the flow rate of the high humid gas gradually increases in a direction approaching the downstream side (i.e., end wall bs2 side).

In the present invention, since the protrusion 4d having a circular stairway shape is provided, the collision area with humid gas gradually widens as it approaches the downstream side. Therefore, high humid gas passing through the plumbing 4 receives the shear force along the surface of the circular stairway as it approaches the downstream side, and is thus pushed toward the outside (toward the radial outward direction of the hollow fiber membrane). That is, high humid gas is pushed toward the outside more certainly than the conventional construction of the plumbing where the end portion of the plumbing is plane shape and the fluid was received by the entire end portion (i.e., plane surface).

As a result of the multiplier effect of these factors, high humid gas loaded through the inlet 4a moves along the surface of the circular stairway, and is then smoothly passed through a plurality of the through holes Tout located at the outlet 4b. Therefore, the occurrence of the fluid remaining at the outlet 4b is prevented, even if the fluid containing steam and condensed water in the mixed condition is directed to the humidifying module of the third embodiment.

Since the occurrence of the remaining fluid can be prevented, the problems, such as the fracture of the plumbing caused by the freezing of remaining fluid and the aggravation of the starting response of a fuel cell by the temperature dropping and freezing of the remaining fluid, can be prevented. The delay of the transient response can also be prevented.

The explanation of a preferred embodiment of the humidification system, in which the humidifying module having the above-described structure and function of the preferred embodiment is applied as the humidifier, will be provided by referring to the attached drawings.

Figure 4:
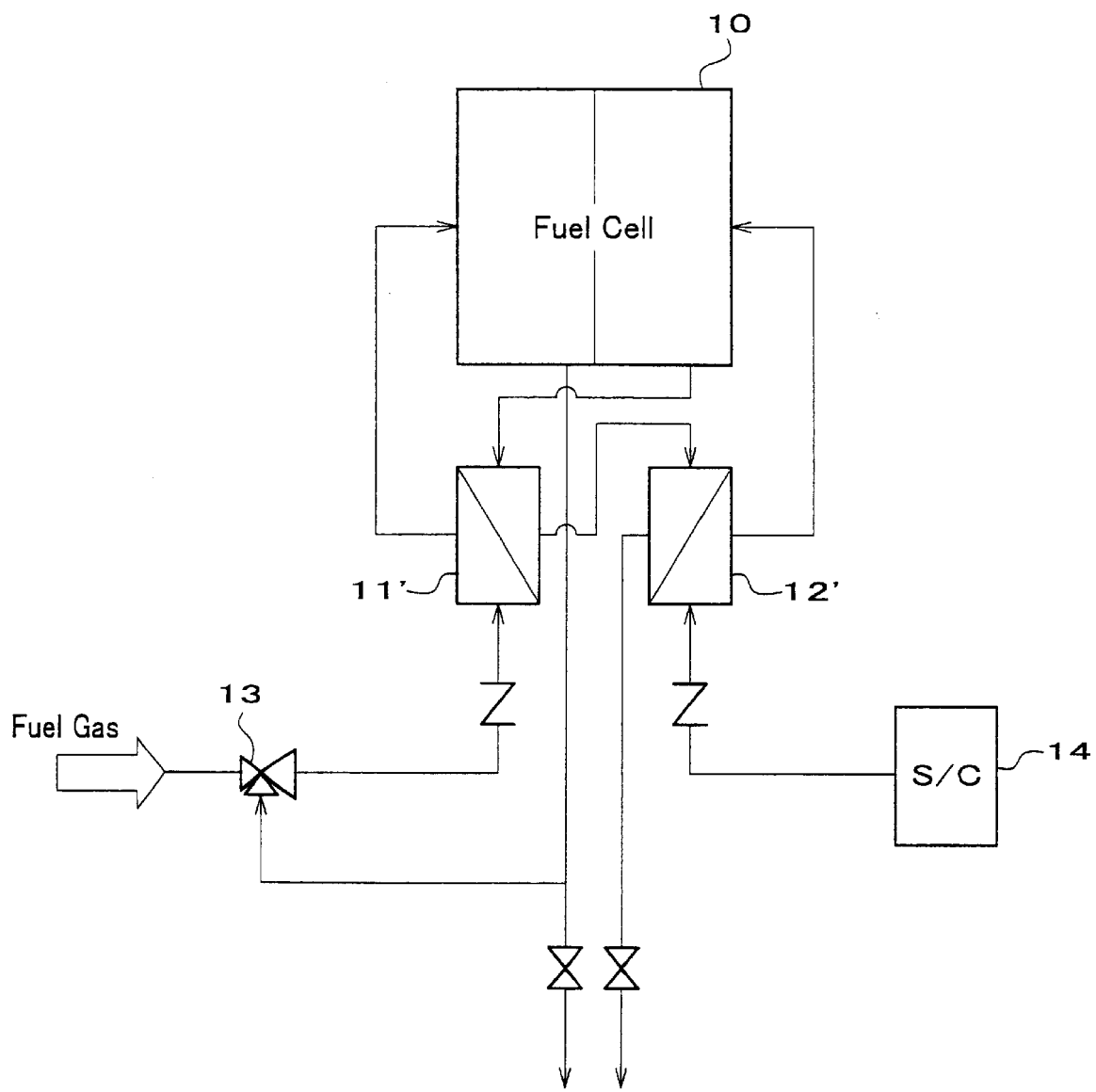
FIG. 4 is a schematic diagram of a humidification system of a fuel cell wherein the humidifying module according to the preferred embodiment is used.

The explanation of the humidification system structure of the fuel cell according to the preferred embodiment will be provided by referring to FIG. 4.

As show in FIG. 4, a humidification system of the fuel cell according to the preferred embodiment includes a fuel cell 10, a humidifier 11', 12', and a supercharger (S/C) 14. The fuel cell 10 generates electric power from the reaction of hydrogen, which is contained in a fuel gas and supplied to the anode, with the oxygen, which is contained in the air and supplied to the cathode.

The humidifier 11' and 12' humidifies the gasses before they are supplied to the anode and cathode of the fuel cell 10, respectively, by performing moisture exchange between the gasses before being supplied to the fuel cell 10, and the discharged gas is discharged from the cathode side of the fuel cell.

The supercharger (S/C) 14 supplies air, which is an oxidizing agent gas, to the cathode of the fuel cell 10. Here, the fuel cell 10 plays the role of the humidification system.

The fuel cell 10 is a solid macromolecular membrane using type fuel cell, and generates the electric power from the reaction of the hydrogen contained in the fuel gas with the oxygen contained in the air.

The reaction proceeds with the formula as bellow.

$$H_2 \rightarrow 2H^+ + 2e^- \quad (1)$$

$$2H^+ + (1/2)O_2 + 2e^- \rightarrow H_2O \quad (2)$$

$$H_2 + (1/2)O_2 \rightarrow H_2O \quad (3)$$

Here, Formula (1) shows a reaction in the anode. Formula (2) shows a reaction in the cathode. Formula (3) shows the reaction carried out in a whole fuel cell.

As a result of the reaction in the fuel cell, water is generated at the cathode. The water generated at the cathode is generally evaporated and then discharged from the fuel cell 10 along with the air not used in the reaction.

In the fuel cell 10 of the solid macromolecular membrane type, furthermore, the solid macromolecular membrane is adopted as an electrolyte layer. The fuel cell 10 has a structure formed by stacking a plurality of single cells, which include a pair of gas diffusion type electrodes, and a separator for separating the fuel gas and the air. In the single cell, the solid macromolecular membrane is sandwiched by a pair of gas diffusion type electrodes, which are also sandwiched by the separator from the outside.

The humidifier 11' and 12' has the humidifying module 1 to which the plumbing 2 is provided as the inner passage. A protrusion 2c is disposed at the end wall bs of the plumbing 2, as shown in FIG. 1.

The hollow fiber membrane used in the humidifier 11' is an ion hydration type non-porosity film (for example, product name: NAFION film), which penetrates only water. On the other hand, the hollow fiber membrane used in the humidifier 12' is a capillary-condensation type of conventional use, and is the porous film, which also penetrates gas molecules other than water.

In the humidifier 11', which supplies the humid fuel gas to the anode of the fuel cell 10, since the non-porosity film is used, only the moisture is certainly moved to the anode side from the cathode side without passing the gasses while performing the moisture exchange between the fuel gas (containing hydrogen) and the exhaust gas (containing oxygen) exhausted from the cathode. Thus, the mixing of the hydrogen gas and the oxygen gas can be prevented, An ejector 13 is one type of a vacuum pump used for circulating the fuel gas supplied to the anode, and a principal part thereof includes a nozzle, a diffuser, a suction room, etc.

The ejector 13 has a simple structure and excels in the operationablity and the maintainability. Since there are no movable portions, such as a rotatable or a slidable portion, the ejector 13 also excels in terms of durability. Moreover, there is also merit that suitable materials having the corrosion resistance can be chosen depending on the type of absorbed gas.

The supercharger (S/C) 14, which is a mechanical supercharger, absorbs the air of atmospheric pressure, compresses it, and then supplies it to the cathode of the fuel cell 10. A lysholm type compressor can also be used instead of supercharger (S/C) 14.

The function of the humidification system of the fuel cell according to the preferred embodiment will be explained as follows. The fuel gas, which is a low humid gas, fed to the ejector 13 is supplied to the humidifier 11' after being compressed by the ejector 13.

The fuel gas (low humid gas) supplied to the humidifier 11' is humidified by the moisture exchange with the exhaust gas (high humid gas) discharged from the cathode of the fuel cell 10 while passing through the inside of the humidifying module equipped in the humidifier 11', and is then supplied to the anode.

The hydrogen contained in the fuel gas supplied to the anode of the fuel cell 10 reacts with the oxygen contained in the air supplied to the fuel cell 10 from the supercharger (S/C) 14 to obtain electric power. The fuel gas not used in the reaction is supplied to the post process (for example, a catalytic combustor) as an exhaust gas. Some of the exhaust gas is absorbed by the ejector 13, and then circulated to the fuel cell 10 for reuse as a fuel gas.

In the super charger (S/C) 14, on the other hand, the air in the atmosphere is absorbed and then led to the humidifier 12' as a low humid gas.

The air (low humid gas) led to the humidifier 12' is humidified by the moisture exchange with the exhaust gas (high humid gas) discharged from the humidifier 11' while passing through the humidifying module, and is then supplied to the cathode.

The air, which is supplied to the cathode in the fuel cell 10 and not used in the reaction with the hydrogen contained in the fuel gas, is supplied to the humidifier 11' as an exhaust gas. The exhaust gas supplied to the humidifier 11' humidifies the fuel gas supplied from the ejector 13 via a moisture exchange, and is then exhausted from the humidifier 11'.

The exhaust gas discharged from the humidifier 11' is supplied to the humidifier 12', and humidifies the air supplied from the supercharger (S/C) 14 by moisture exchange. The exhaust gas, after the moisture exchange, is discharged from the humidifier 12' and supplied to the post process, for example, a catalytic combustor.

A second embodiment of the humidification system, in which the humidifying module of the preferred embodiment is used as the humidifier of the fuel cell, will be explained by referring to the attached drawings. In the following explanation, the same components and the plumbing from the preferred embodiment are used.

Figure 5:
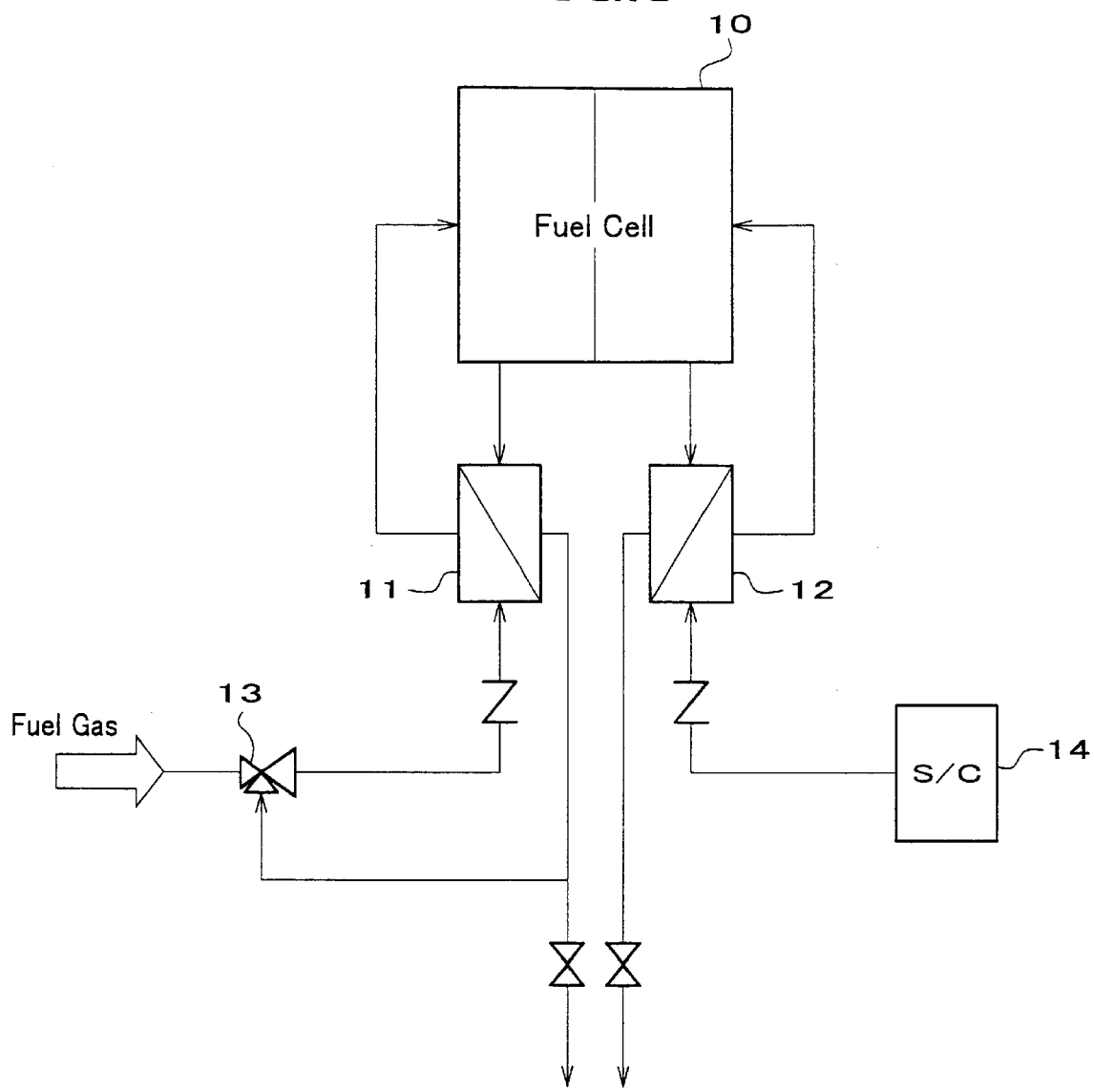
FIG. 5 is a schematic diagram of another embodiment of the humidification system of the fuel cell wherein the humidifying module according to the second embodiment is used.

As shown in FIG. 5, the differences in the structure of the humidification system between the preferred embodiments is in the arrangement of the humidifiers 11 and 12.

The humidifier 11 carries out the moisture exchange between the fuel gas supplied to the anode and the exhaust gas discharged from the anode. The humidifier 12 carries out the moisture exchange between the air supplied to the cathode and the exhaust gas discharged from the cathode.

In the humidification system according to the second embodiment, a porous membrane is used as the hollow fiber membrane used in the humidifiers 11 and 12.

The structure of components, except for the above-described, is the same as in the preferred embodiment, thus the explanation of same is omitted herefrom.

The function of the humidification system of the fuel cell according to the second embodiment will be explained by referring to FIG. 5.

The fuel gas, which is a low humid gas, fed to the ejector 13 is supplied to the humidifier 11 by the ejector 13. The fuel gas (low humid gas) supplied to the humidifier 11 is humidified by moisture exchange with the exhaust gas (high humid gas) discharged from the anode of the fuel cell 10 while passing through the humidifying module equipped in the humidifier 11.

The hydrogen contained in the fuel gas is supplied to the anode of the fuel cell 10 and reacts with the oxygen contained in the air, which is supplied to the cathode of the fuel cell 10 from the super charger (S/C) 14, to thereby obtain electric power. The fuel gas not used in the reaction is again supplied to the humidifier 11 as an exhaust gas (off gas).

The exhaust gas led to the humidifier 11 humidifies the fuel gas supplied to the humidifier 11 from the ejector 13 by giving the moisture, and is then supplied to the post process, for example, a catalytic-combustor. Some of the exhaust gas discharged from the humidifier 11 is absorbed by the ejector 13, and then circulated to the anode of the fuel cell 10 as a fuel gas.

In the super charger (S/C) 14, on the other hand, the air in the atmosphere is absorbed and then led to the humidifier 12 as a low humid gas.

The air (low humid gas) led to the humidifier 12 is humidified by moisture exchange with the exhaust gas (high humid gas) discharged from the cathode of the fuel cell 10 while passing through the humidifying module, and is then supplied to the cathode.

The air not used in the reaction with the hydrogen contained in the fuel gas is discharged from the fuel cell 10 and supplied to the humidifier 12 as an exhaust gas. The exhaust gas supplied to the humidifier 12 humidifies the fuel gas supplied from the super charger 14 by giving the moisture, and is then supplied to the post process, for example, a catalytic combustor.

Figure 6:
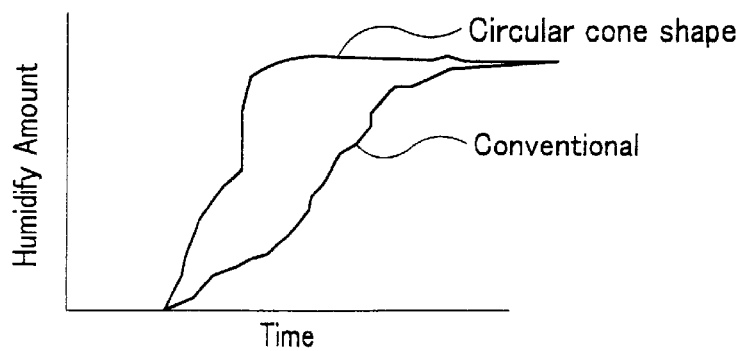
FIG. 6 is a graph showing the timewise change of the humidification amount from the startup to the stable operative condition.

The operation result of the humidification system of the fuel cell according to the preferred embodiment will be explained by referring to FIG. 6 through FIG. 8. FIG. 6 is a graph showing the timewise change of the humidification amount from startup to a stable operative condition. As can be seen from FIG. 6, the total time required for achieving the stable operating condition after obtaining a constant amount of humidification is shorter than the humidification system of the conventional fuel cell.

Figure 7A:
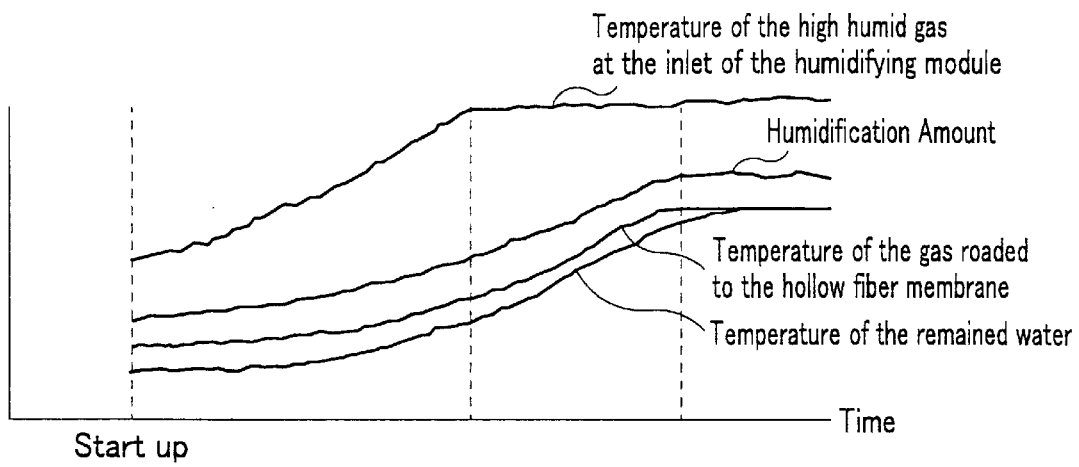
FIG. 7A is a graph showing the timewise change of the total time required for achieving a stable operating condition after startup of the humidifying module of conventional technique.
Figure 7B:
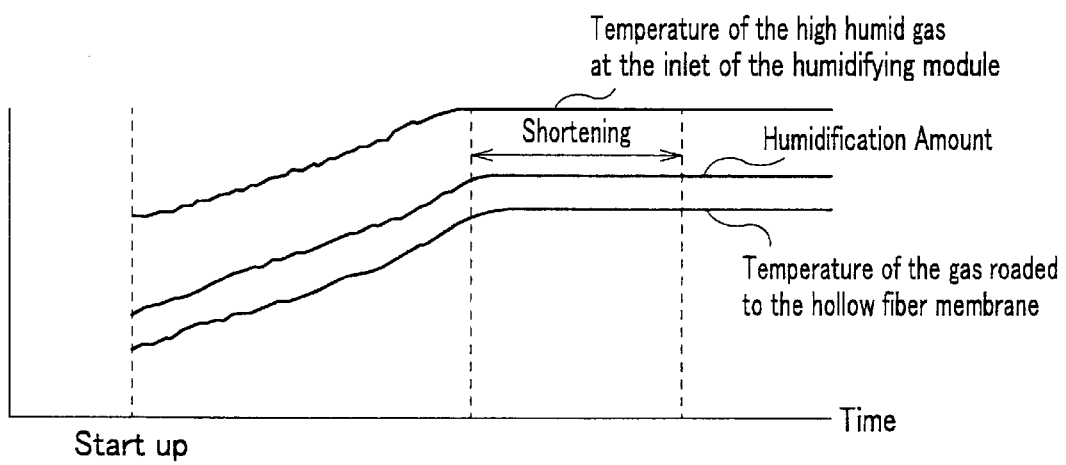
FIG. 7B is a graph showing the timewise change of the total time required for achieving a stable operating condition after startup of the humidifying module of the present invention.

FIG. 7A is a graph showing the timewise change of the total time required for achieving a stable operating condition after startup of the humidifying module using the conventional technique. FIG. 7B is a graph showing the timewise change of the total time required for achieving a stable operating condition after startup of the humidifying module of the present invention.

As can be seen from FIG. 7A and FIG. 7B, in the humidifying module of the present invention, the total time required for achieving a stable operating condition after startup is shorter than the conventional manner.

Figure 8:
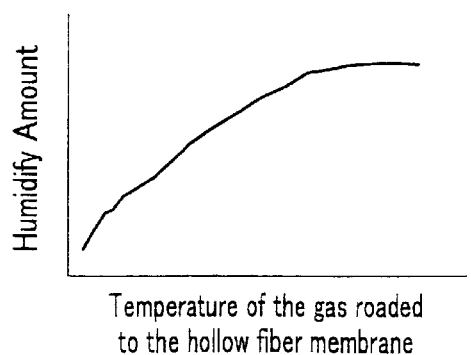
FIG. 8 is a graph showing the relation between the humidification amount and the temperature of the gas directed to the hollow fiber membrane bundle.
Figure 9:
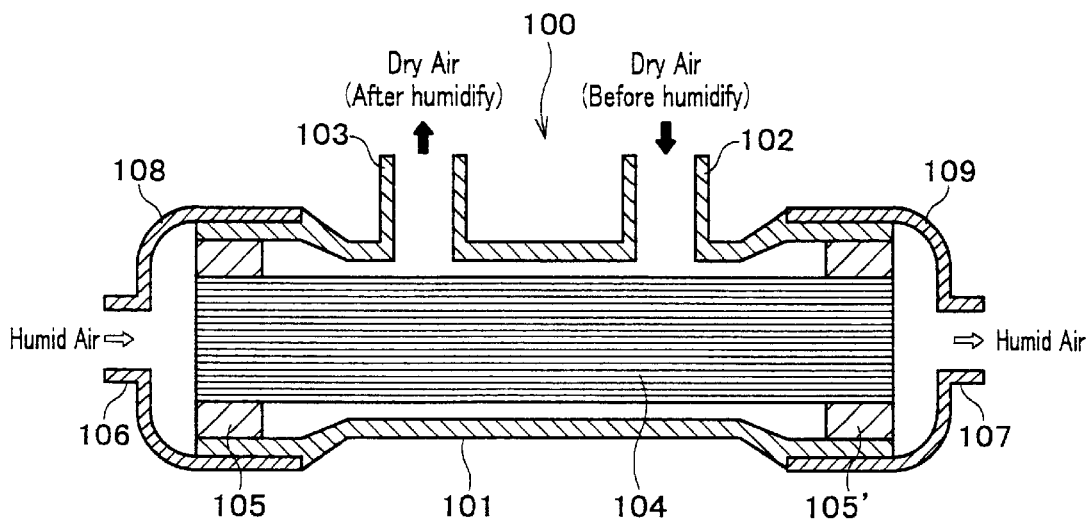
FIG. 9 is a sectional view showing a humidifier using a conventional humidifying module.
Figure 10:
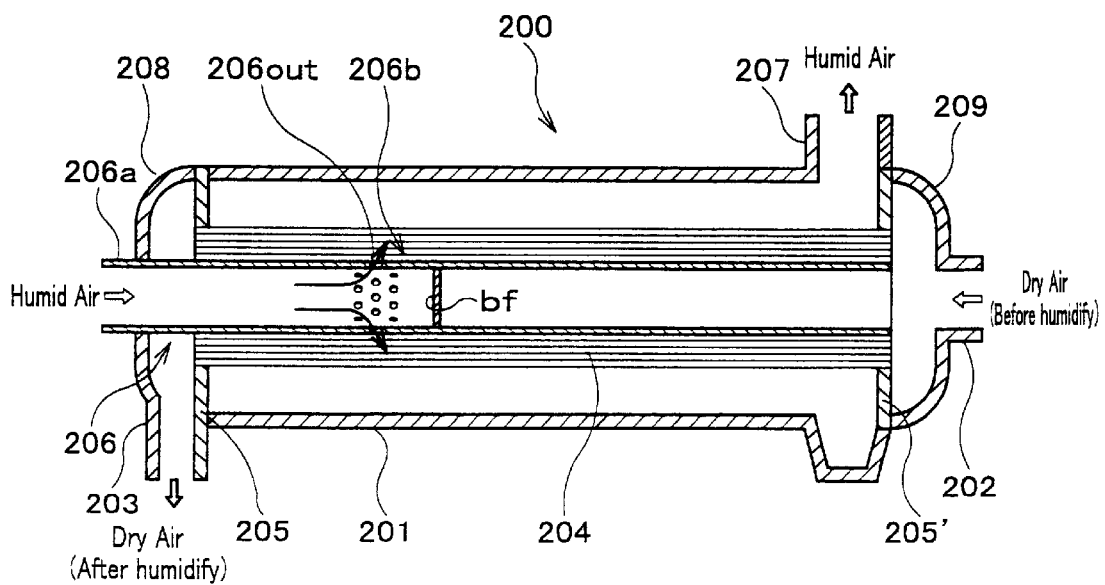
FIG. 10 is a sectional view showing a humidifier using a conventional humidifying module of another embodiment.
Figure 11:
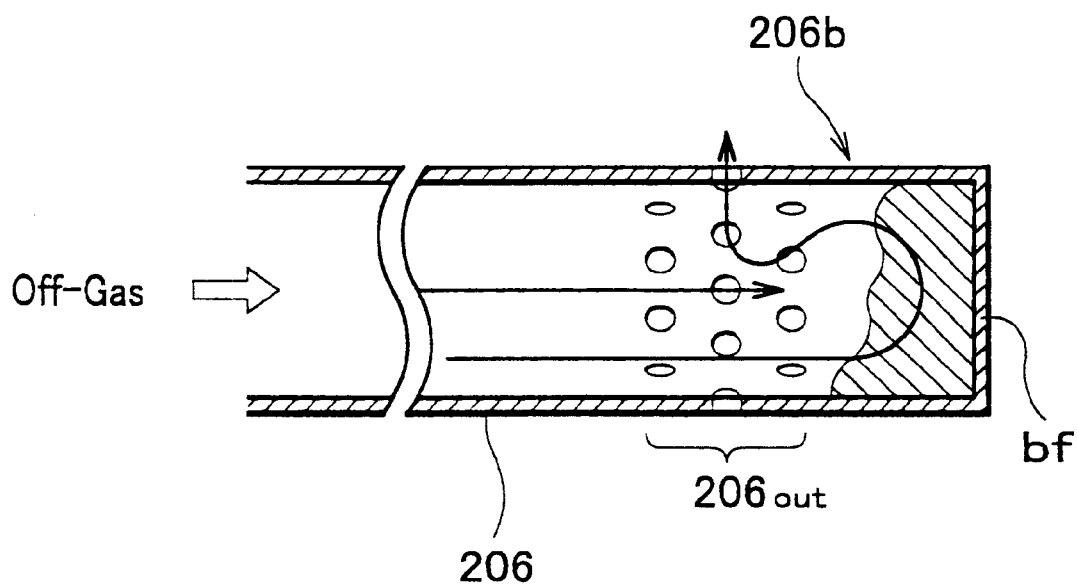
FIG. 11 is a sectional view showing the disadvantage in the conventional humidifying module of the another embodiment.

FIG. 8 is a graph showing the relation between the humidification amount and the temperature of the gas loaded into the hollow fiber membrane bundle. As can be seen from FIG. 8, the total humidification amount increases as the temperature of the gas loaded into the hollow fiber membrane bundle increases.

As described above, since the fuel gas supplied to the fuel cell is humidified using the humidifier of the preferred embodiment, the occurrence of the water remaining on the bottom of the plumbing can be prevented, even if the fluid, with steam and condensed water contained therein, is passed through the inner flow passage. Thus, the problems associated with the conventional systems, such as the fracture of the plumbing caused by the remaining water freezing, and the cooling down of the high humid gas discharged from the fuel cell by the remaining water, can be prevented.

In the present invention, furthermore, the gas led to the hollow fiber membrane bundle can be adjusted to the desired temperature in a short amount of time. Therefore, the humidifying module of the humidification system with superior startup and output efficiency is obtained.

In the present invention, the following advantages are realized.

The cross-sectional flow area of the fluid decreases as the fluid approaches the downstream side (i.e., end wall side) between the tip of the protrusion and the end wall itself. Thus, the flow rate of the fluid gradually increases as the fluid flow approaches the downstream side (i.e., end wall side).

The protrusion is provided so that the collision area with fluid gradually widens as the fluid approaches the downstream side (i.e., end wall side). Therefore, the fluid receives a shear force along the surface of the protrusion as the fluid approaches the downstream side. The fluid is thus pushed toward the outside (i.e., toward the radial outward direction of the inner flow passage). That is, fluid is pushed toward the outside more certainly than the inner flow passage of the conventional construction wherein the end portion is plane shaped and the fluid is received by the entire end portion (i.e., plane surface).

As a result of the multiplier effect of these factors, the fluid smoothly passes through the outlet of the inner flow passage. Thus, the occurrence of fluid remaining at the bottom is prevented, even if the fluid containing steam and condensed water in the mixed condition is led into the humidifying module.

As a result, the occurrence of fluid remaining can be prevented. Problems, such as the fracture of the plumbing caused by the remaining fluid freezing, and the cooling down of the high-temperature gas discharged from the fuel cell by the remaining water, can thus be prevented.

Therefore, the humidifying module provides efficient output and startup operations to the fuel cell, even if it is used to humidify the gas supplied to the fuel cell.

According to the present invention, the same type of circular members are used, that is, the shape of the inner flow passage is a cylinder shape and the shape of the protrusion part is a circular cone. Thus, a humidifying module with superior workability is obtained.

Since the fluid is supplied over the whole hollow fiber membrane bundle with sufficient fluid distribution in the radial direction, the usability of the hollow fiber membrane is improved.

In the present invention, the flow rate is perpendicular to the direction of the fluid. In other words, the rate of diffusion in the radial direction is increased by arranging the through holes at the vicinity of the end wall of the inner flow passage along the circumference. Thus, the fluid is supplied over the whole hollow fiber membrane bundle with sufficient fluid distribution toward the radial direction, and then the usability of the hollow fiber membrane is improved.

In the present invention, at least one through hole is positioned in the downstream side between the tip of the protrusion and the end wall.

In the plumbing, therefore, the cross-sectional flow area of the fluid decreases as it approaches the downstream side (i.e., the end wall side) between the tip of the protrusion and the end wall. Thus, the flow rate of the high humid gas increases as it approaches the downstream side (i.e., end wall side).

In the plumbing, therefore, the protrusion is provided at the end wall of the inner flow passage so that the tip of the protrusion is opposite the flow direction of the fluid. Thus, the collision area with humid gas gradually widens as it approaches the downstream side. Therefore, the fluid receives a shear force along the surface of the protrusion as the downstream side approaches, and is pushed toward the outside. That is, fluid is pushed toward the outside more certainly than the structure of the conventional plumbing where the end wall of the plumbing is plane shaped and the fluid was received by the entire end wall (i.e., plane surface).

In the plumbing, as a result of the multiplier effect of these factors, when fluid is led to the inner flow passage, the fluid led therein smoothly passes through the through hole because at least one through hole is positioned at the downstream side between the tip of the protrusion and the end wall.

If the through hole is positioned upstream of the tip of the protrusion, since the passing of the fluid is disturbed by the fluid rebounding from the end wall, the above-described advantages would not be obtained.

What is claimed is:

1. A humidifying module comprising:
    a plurality of hollow fiber membranes grouped together to form a hollow fiber membrane bundle, wherein a moisture exchange is performed across a thickness of each hollow fiber membrane between fluid streaming within an interior of said each hollow fiber membrane and along an exterior of said each hollow fiber membrane;
    an inner flow passage inserted within said hollow fiber membrane bundle and along a longitudinal axis of said hollow fiber membrane bundle,
    wherein a total longitudinal length which said inner flow passage is inserted within said hollow fiber membrane bundle is shorter than a longitudinal length of said hollow fiber membrane bundle, and
    wherein said inner flow passage includes:
        an inlet and an outlet through which the fluid passes, and
        an end wall located proximate said outlet; and
    a protrusion disposed at said end wall and opposite a flow direction of the fluid streaming within said inner flow passage.

2. A humidifying module according to the claim 1, wherein said inner flow passage is formed to have a cylinder shape, and said protrusion is formed to have a circular cone shape.

3. A humidifying module according to the claim 1, wherein said outlet comprises a plurality of through holes bored in a circumferential wall of said inner flow passage proximate said end wall, wherein at least one through hole of said plurality of through holes is positioned between a tip of said protrusion remote from said end wall and said end wall.

4. A humidifying module according to the claim 2, wherein said outlet comprises a plurality of through holes bored in a circumferential wall of said inner flow passage proximate said end wall, wherein at least one through hole of said plurality of through holes is positioned between a tip of said protrusion remote from said end wall and said end wall.

5. A humidifying module according to the claim 1, wherein said protrusion comprises a plurality of plates stacked on top of each other and having a diameter that gradually decreases in a direction from said end wall toward said inlet of said inner flow passage, wherein said plates are circular shaped.

6. A humidifying module according to the claim 1, wherein said protrusion comprises a plurality of plates stacked on top of each other and having a width and height that gradually decrease in a direction from said end wall toward said inlet of said inner flow passage.

7. A humidifying module comprising:
    a plurality of hollow fiber membranes grouped together to form a hollow fiber membrane bundle, wherein a moisture exchange is performed across a thickness of each hollow fiber membrane between fluid streaming within an interior of said each hollow fiber membrane and along an exterior of said each hollow fiber membrane;
    a hollow, cylindrical shaped inner flow passage inserted within said hollow fiber membrane bundle, wherein a longitudinal length of said inner flow passage is shorter than a longitudinal length of said hollow fiber membrane bundle, and wherein said inner flow passage includes:
        an inlet and an outlet through which the fluid passes, and
        an end wall located near said outlet; and
    a protrusion disposed at said end wall wherein an inner cross-sectional area of said inner flow passage gradually decreases in a direction taken from an inlet of said inner flow passage toward said end wall.

8. A humidifying module according to the claim 7, wherein said outlet comprises a plurality of through holes bored in a circumferential wall of said inner flow passage proximate said end wall, wherein at least one through hole of said plurality of through holes is located between a tip of said protrusion remote from said end wall and said end wall.

9. A humidifying module according to the claim 7, wherein said protrusion has a circular cone shape.

10. A humidifying module according to the claim 7, wherein said protrusion comprises a plurality of plates stacked on top of each other and having a diameter that gradually decreases in a direction from said end wall toward said inlet of said inner flow passage, wherein said plates are circular shaped.

11. A humidifying module according to the claim 7, wherein said protrusion comprises a plurality of plates stacked on top of each other and having a width and height that gradually decrease in a direction from said end wall toward said inlet of said inner flow passage.

12. A humidifying module comprising:

a plurality of hollow fiber membranes grouped together to form a hollow fiber membrane bundle, wherein a moisture exchange is performed across a thickness of each hollow fiber membrane between fluid streaming within an interior of said each hollow fiber membrane and along an exterior of said each hollow fiber membrane;

a hollow, square shaped inner flow passage inserted within said hollow fiber membrane bundle, wherein a longitudinal length of said inner flow passage is shorter than a longitudinal length of said hollow fiber membrane bundle, and wherein said inner flow passage includes:

an inlet and an outlet through which the fluid passes, and an end wall located near said outlet; and a protrusion disposed at said end wall wherein an inner cross-sectional area of said inner flow passage gradually decreases in a direction taken from an inlet of said inner flow passage toward said end wall.

13. A humidifying module according to the claim 12, wherein said outlet comprises a plurality of through holes bored in an outer wall of said inner flow passage proximate said end wall, wherein at least one through hole of said plurality of through holes is located between a tip of said protrusion remote from said end wall and said end wall.

14. A humidifying module according to the claim 12, wherein said protrusion has a circular cone shape.

15. A humidifying module according to the claim 12, wherein said protrusion comprises a plurality of plates stacked on top of each other and having a diameter that gradually decreases in a direction from said end wall toward said inlet of said inner flow passage, wherein said plates are circular shaped.

16. A humidifying module according to the claim 12, wherein said protrusion comprises a plurality of plates stacked on top of each other and having a width and height that gradually decrease in a direction from said end wall toward said inlet of said inner flow passage.

* * * * *